United States Patent
Hikiri et al.

(10) Patent No.: US 10,315,522 B2
(45) Date of Patent: Jun. 11, 2019

(54) CHARGE/DISCHARGE SYSTEM

(71) Applicant: VOLVO LASTVAGNAR AKTIEBOLAG, Gothenburg (SE)

(72) Inventors: Kunihiko Hikiri, Saitama (JP); Takayuki Tsuchiya, Saitama (JP)

(73) Assignee: Volvo Lastvagnar AB, Göteborg (SE)

(*) Notice: Subject to any disclaimer, the term of this patent is extended or adjusted under 35 U.S.C. 154(b) by 67 days.

(21) Appl. No.: 15/036,068

(22) PCT Filed: Nov. 13, 2013

(86) PCT No.: PCT/JP2013/080675
§ 371 (c)(1),
(2) Date: May 12, 2016

(87) PCT Pub. No.: WO2015/071977
PCT Pub. Date: May 21, 2015

(65) Prior Publication Data
US 2016/0288662 A1    Oct. 6, 2016

(51) Int. Cl.
*H02J 7/14* (2006.01)
*H02J 7/34* (2006.01)
(Continued)

(52) U.S. Cl.
CPC ............ *B60L 11/1814* (2013.01); *B60K 6/28* (2013.01); *B60K 6/40* (2013.01); *B60K 6/46* (2013.01);
(Continued)

(58) Field of Classification Search
CPC .. B60L 11/1814; B60L 11/005; B60L 11/123; B60L 11/18; B60L 11/00;
(Continued)

(56) References Cited

U.S. PATENT DOCUMENTS

2008/0315813 A1* 12/2008 Yamada ................. B60K 6/365
                                                    318/432
2009/0315518 A1* 12/2009 Soma ..................... B60K 6/445
                                                    320/134
(Continued)

FOREIGN PATENT DOCUMENTS

CN           102844956 A     12/2012
EP             1655165 A2     5/2006
(Continued)

OTHER PUBLICATIONS

European Official Action (Jun. 7, 2017) for corresponding European App. 13897596.6.
(Continued)

*Primary Examiner* — Richard Isla
*Assistant Examiner* — Dung V Bui
(74) *Attorney, Agent, or Firm* — WRB-IP LLP (57) ABSTRACT

A charge/discharge system includes a controller to control an electric power converter placed between a capacitor and a secondary battery connected in parallel. The controller includes: a request power calculation unit configured to calculate request input/output power for the electric motor generator based on current and voltage of the capacitor and input output current of the electric power converter; a capacitor discharging bias factor map configured to specify a ratio of electric power to be supplied from the capacitor to the electric motor generator to the request input power of the electric motor generator; a capacitor charging bias factor map configured to specify a ratio of electric power to be stored in the capacitor from the electric motor generator to the request output power of the electric motor generator; and a subtraction unit configured to calculate charge/discharge power of the secondary battery by subtracting, from the
(Continued)

request input/output power, the charge/discharge power of the capacitor.

5 Claims, 6 Drawing Sheets (51) Int. Cl.
*B60L 11/18* (2006.01)
*B60L 11/00* (2006.01)
*B60L 1/00* (2006.01)
*B60L 7/16* (2006.01)
*B60K 6/28* (2007.10)
*B60K 6/40* (2007.10)
*B60K 6/46* (2007.10)
*H02J 7/00* (2006.01)
*B60L 7/14* (2006.01)
*B60L 11/12* (2006.01)
*B60L 11/14* (2006.01)

(52) U.S. Cl.
CPC .............. *B60L 1/003* (2013.01); *B60L 7/14* (2013.01); *B60L 7/16* (2013.01); *B60L 11/005* (2013.01); *B60L 11/123* (2013.01); *B60L 11/14* (2013.01); *B60L 11/1853* (2013.01); *B60L 11/1861* (2013.01); *H02J 7/007* (2013.01); *H02J 7/0065* (2013.01); *H02J 7/14* (2013.01); *B60L 2210/14* (2013.01); *B60L 2210/40* (2013.01); *B60L 2240/34* (2013.01); *B60L 2240/529* (2013.01); *B60L 2240/547* (2013.01); *B60L 2240/549* (2013.01); *B60Y 2200/92* (2013.01); *B60Y 2300/91* (2013.01); *B60Y 2400/11* (2013.01); *B60Y 2400/61* (2013.01); *H02J 7/345* (2013.01); *H02J 2007/0067* (2013.01); *Y02T 10/70* (2013.01); *Y02T 10/705* (2013.01); *Y02T 10/7005* (2013.01); *Y02T 10/7022* (2013.01); *Y02T 10/7044* (2013.01); *Y02T 10/7077* (2013.01); *Y02T 10/7225* (2013.01); *Y02T 10/7241* (2013.01); *Y10S 903/907* (2013.01); *Y10S 903/951* (2013.01)

(58) Field of Classification Search
CPC ...... B60L 11/12; B60L 11/14; B60L 11/1853; B60L 11/1861; B60L 7/14; B60L 7/16; B60L 1/003; B60L 1/00; B60L 2210/14; B60L 2210/40; B60L 2240/34; B60L 2240/529; B60L 2240/547; B60L 2240/549; B60K 6/46; B60K 6/28; B60K 6/40; H02J 7/0065; H02J 7/007; H02J 7/00; H02J 7/14; B60Y 2200/92
USPC ........................................................ 320/109
See application file for complete search history.

(56) References Cited

U.S. PATENT DOCUMENTS

| 2010/0100265 | A1 | 4/2010 | Kato | |
| 2010/0270860 | A1* | 10/2010 | Kamaga | B60K 6/365 307/10.7 |
| 2010/0273080 | A1* | 10/2010 | Noguchi | B60L 11/1881 429/442 |
| 2011/0101915 | A1* | 5/2011 | Mitsutani | B60K 6/445 320/109 |
| 2012/0013182 | A1* | 1/2012 | Minegishi | B60K 6/365 307/9.1 |
| 2013/0043844 | A1* | 2/2013 | Tashiro | B60L 15/2045 320/128 |
| 2013/0264975 | A1* | 10/2013 | Kaita | B60L 11/1853 318/139 |

FOREIGN PATENT DOCUMENTS

| JP | 06319287 A | * 11/1994 |
| JP | 2003-249236 A | 9/2003 |
| JP | 2006-136143 A | 5/2006 |
| JP | 2008098098 A | 4/2008 |
| JP | 2008-295123 A | 12/2008 |
| JP | 2010-041847 A | 2/2010 |
| JP | 2010-272247 A | 12/2010 |
| JP | 2012157209 A | 8/2012 |

OTHER PUBLICATIONS

International Search Report (dated Feb. 10, 2014) for corresponding International App. PCT/JP2013/080675.
Chinese Official Action (dated Apr. 3, 2018) for corresponding Chinese Appl 201380080921.7.

* cited by examiner

CHARGE/DISCHARGE SYSTEM

BACKGROUND AND SUMMARY

The present invention relates to a charge/discharge system capable of supplying electric power to an electric motor generator and of charging with regenerative electric power from the electric motor generator.

Conventionally batteries have been used to supply electric power to an electric motor as a driving-power source for a vehicle or the like. Examples of the battery used include secondary batteries such as a lead storage battery and a lithium-ion battery. Other devices other than batteries also are known to charge/discharge electric energy using an electric double-layer capacitor or the like.

Batteries have large storable capacity, but their life will be shortened if charge/discharge is performed frequently or with a large charge/discharge depth. On the contrary, capacitors are robust over such frequent charge/discharge or a large charge/discharge depth and have a long life, but have relatively small storable capacity. In this way, batteries and capacitors are different in their characteristics, and therefore when a battery and a capacitor are mounted together, it is necessary to control them in accordance with their respective characteristics.

JP 2008-035670 A discloses an electric-power supplying apparatus for a vehicle provided with a plurality of charging mechanisms including a battery and a capacitor that is configured to keep the sufficient charging amount of the capacitor whose output performance is superior to the battery.

The electric-power supplying apparatus described in JP2008-035670A is configured to it the voltage of the capacitor is lower than the boosted voltage obtained by increasing the rated voltage by a boosting converter, charge the capacitor with electric power supplied from the battery. This may lead to the risk of deterioration in energy efficiency because charge discharge is performed between the battery and the capacitor.

In view of the aforementioned problems, it is desirable to improve energy efficiency of a charge/discharge system including a capacitor and a secondary battery.

According to one aspect of the present invention, a charge/discharge system capable of supplying electric power to an electric motor generator and of charging with regenerative electric power from the electric motor generator is provided, the charge/discharge system including: a capacitor connected to the electric motor generator; a secondary battery connected in parallel to the capacitor; an electric power converter placed between the capacitor and the secondary battery to increase/decrease charge/discharge voltage of the secondary battery; and a compeller to control the electric power converter. The controller includes: a request power calculation unit configured to calculate request input output power for the electric motor generator based on current and voltage of the capacitor and input/output current of the electric power converter; a capacitor discharging bias factor map configured to specify a ratio of electric power to be supplied from the capacitor to the electric motor generator to the request input power calculated by the request power calculation unit, based on the SOC of the capacitor; a capacitor charging bias factor map configured to specify a ratio of electric power to be stored in the capacitor from the electric motor generator to the request output power calculated by the request power calculation unit, based on the SOC of the capacitor; and a subtraction unit configured to calculate charge/discharge power of the secondary battery by subtracting, from the request input/output power, the charge/discharge power of the capacitor obtained from the capacitor discharging bias factor map or the capacitor charging bias factor map.

DETAILED DESCRIPTION

Referring to the drawings, the following describes one embodiment of the present invention.

Firstly the configuration of a charge/discharge system 1 according to one embodiment of the present invention is described below, with reference to FIG. 1.

The charge/discharge system 1 includes: a motor generator 2 as an electric motor generator; an inverter 3 to drive the motor generator 2; a capacitor 10 connected to the motor generator 2 via the inverter 3; a secondary battery 20 connected in parallel to the capacitor 10; an electric power convener 30 placed between the capacitor 10 and the secondary battery 20; a controller 50 to control the electric power convener 30; and an ECU (Electronic Control Unit) 100 to control the vehicle as a whole including the charge/discharge system 1. The charge/discharge system 1 can supply electric power to the motor generator 2 and can be charged with regenerative electric power from the motor generator 2.

The capacitor 10 includes an electric double-layer capacitor to charge/discharge electric power. The secondary battery 20 includes a nickel-hydride secondary battery or a lithium ion secondary battery, for example, to charge/discharge electric power.

The capacitor 10 and the secondary battery 20 supply the stored electric power to the motor generator 2 via the inverter 3. Then the capacitor 10 and the secondary battery 20 are charged with electric power generated by the motor generator 2, via the inverter 3. The inverter 3 performs AC-DC conversion between the capacitor 10 or the secondary battery 20 and the motor generator 2.

The electric power converter 30 includes a DC/DC converter, for example. The electric power converter 30 increases the voltage of electric power discharged from the secondary battery 20, and supplies it to the motor generator 2. The electric power converter 30 decreases the voltage of regenerative electric power from the motor generator 2 and charges the secondary battery 20 with it, In this way, the electric power converter 30 increases/decreases the charge/discharge voltage of the secondary battery 20.

Electric auxiliaries 9 are connected to the secondary battery 20, and the secondary battery 20 supplies electric power to the electric auxiliaries 9. The electric auxiliaries 9 include a pump of an air conditioner or a coolant circuit, a radiator fan, and other electrically driven units, for example.

The motor generator 2 functions as a vehicle driving power source to rotate driving wheels 5. When the vehicle is decelerated, the motor generator 2 functions as a generator, and the power is recovered as regenerative electric power. An engine 4 functions as a vehicle driving power source solely or together with the motor generator 2. Further the engine 4 may drive the motor generator 2 to make the motor generator 2 generate electric power.

The ECU 100 controls operation of the inverter 3 and the engine 4. The ECU 100 is electrically connected to the controller 50 communicably. When a request is issued to move the vehicle from the stop state, the ECU 100 supplies electric, power stored in the capacitor 10 and the secondary battery 20 to the motor generator 2 via the inverter 3, thus starting to move the vehicle. If the SOC of both of the capacitor 10 and the secondary battery 20 is low or if large power is required, for example, the ECU 100 makes the engine 4 operate for hybrid traveling so that the vehicle travels with the driving force of the engine 4 and the driving force of the motor generator 2.

Thereafter, when deceleration of the vehicle in the traveling state is requested, the ECU 100 drives the motor generator 2 as a generator, and the generated electric power is stored in the capacitor 10 and the secondary battery 20 via the inverter 3.

Next, operation of the thus configured charge/discharge system 1 is described below.

The secondary battery 20 includes a lithium ion secondary battery. The life of the secondary battery 20 is significantly shortened if charge/discharge is performed frequently with high power or with a large charge/discharge depth. Therefore, it is necessary to control the secondary battery so as to avoid such charge/discharge. Although the capacitor 10 has charging capacity smaller than that of the secondary battery 20, it is resistant to shortening of the life resulting from charge/discharge performed frequently with high power or with a large charge/discharge depth.

Due to such characteristics, it is preferable that the electric power stored in the capacitor 10 be used when high electric power is to be supplied to the motor generator 2 within a short time, such as the case where the vehicle starts to move. However, the electric power storable in the capacitor 10 is limited, and therefore it is preferable that a mechanism enabling usage of the electric power stored in the secondary battery 20 as needed be provided.

In this way, controlling of electric power charge/discharge that is suitable for each of the characteristics of the capacitor 10 and the secondary battery 20 is performed, whereby energy efficiency can be improved without shortening the life of the secondary battery 20, and so fuel efficiency of the vehicle can be improved.

Figure 1:
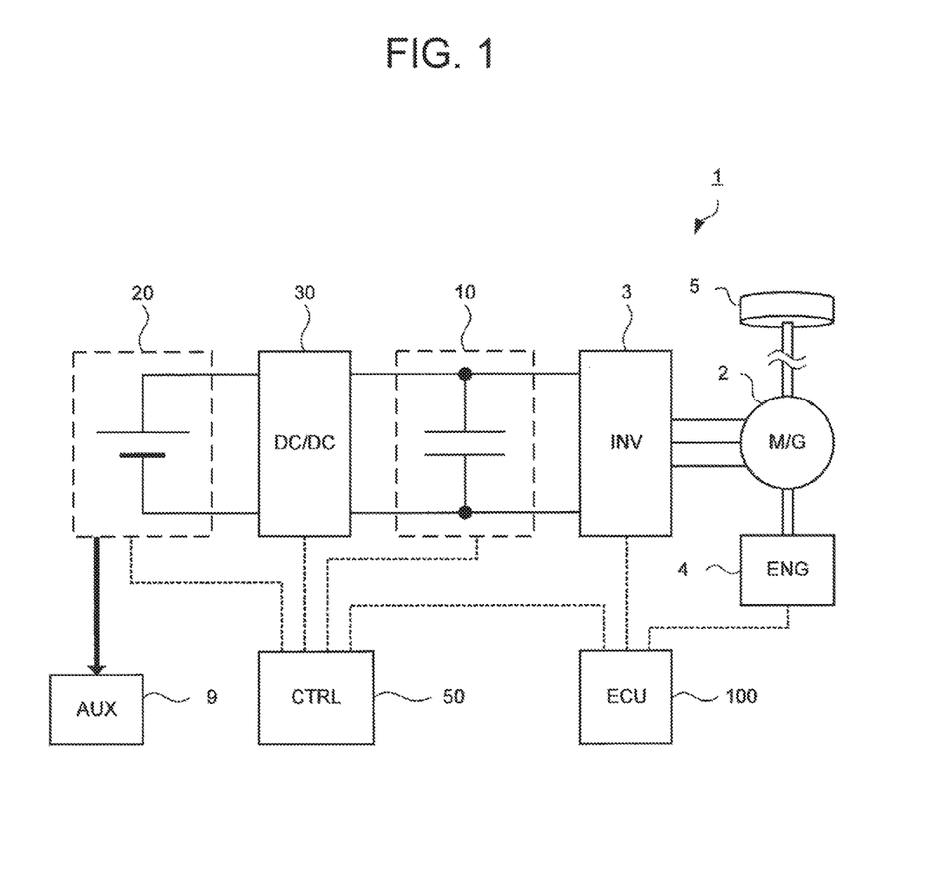
FIG. 1 shows the configuration of a vehicle including a charge/discharge system according to one embodiment of the present invention.

In the charge/discharge system 1 configured as in FIG. 1, the ECU 100 controls as to whether to drive the motor generator 2 or to make the motor generator 2 generate electric power based on the state of the vehicle. The controller 50 controls the electric power converter 30 to determine the ratio of input/output voltages of each of the capacitor 10 and the secondary battery 20 during, charge/discharge. Such control by the controller 50 is described later in details.

Based on a request from the driver on acceleration/deceleration, the vehicle speed and the SOC of the capacitor 10, for example, the ECU 100 controls driving and power generation at the motor generator 2 as well as the operation of the engine 4.

Next, the controller 50 is described below referring to FIGS. 2 to 4B.

Figure 2:
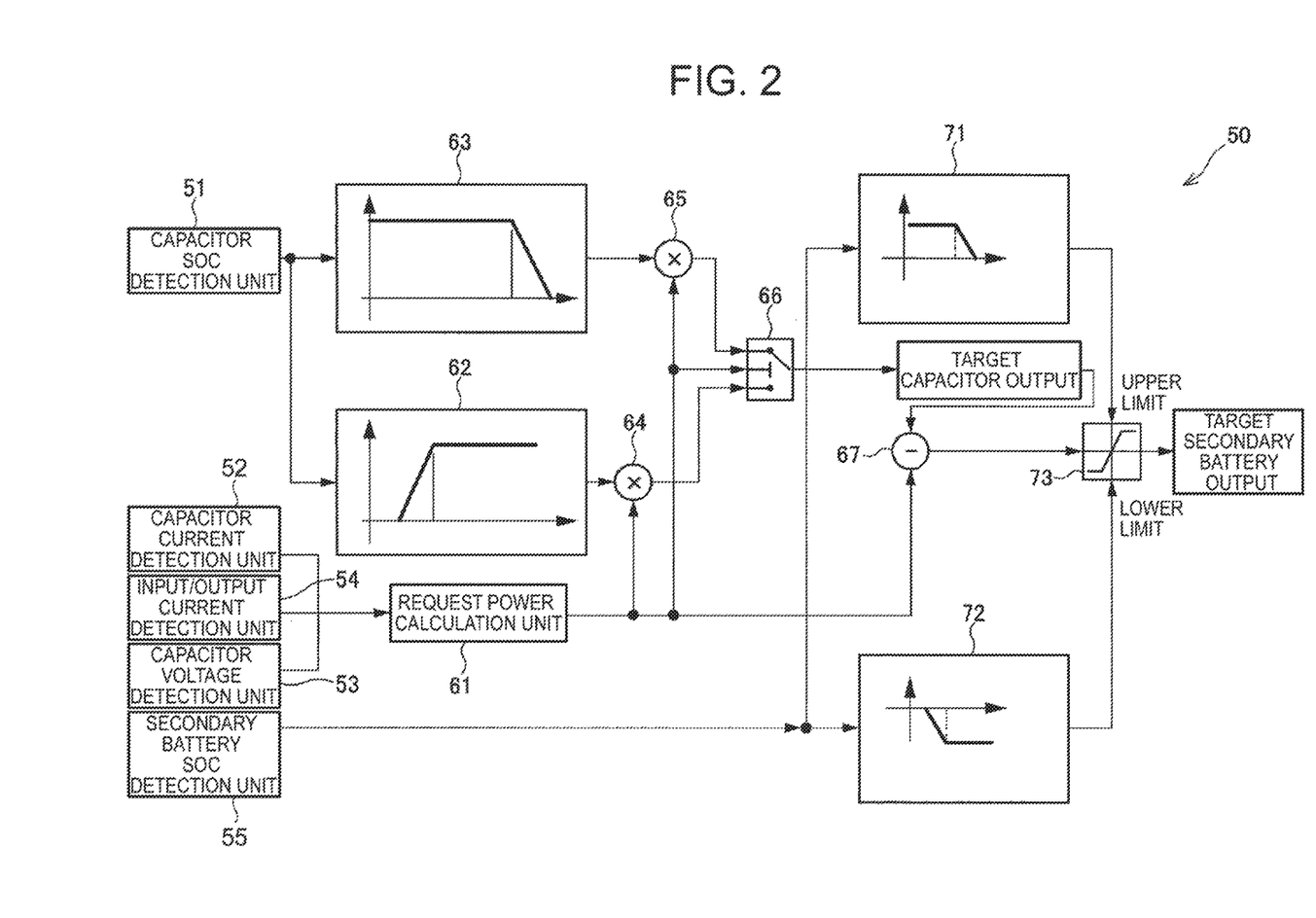
FIG. 2 is a block diagram of a controller in the charge/discharge system.

As shown in FIG. 2, the controller 50 includes: a capacitor SOC detection unit 51 to detect the SOC (State of Charge) [%] of the capacitor 10; a capacitor current detection unit 52 to detect current Ic [A] input/output with respect to the capacitor 10; a capacitor voltage detection unit 53 to detect voltage Vc [V] of the capacitor 10; an input/output current detection unit 54 to detect input/output current Ibref [A] at the electric power converter 30 between the motor generator 2 and the electric power converter; and a secondary battery SOC detection unit 55 to detect the SOC [%] of the secondary battery 20. The controller 50 controls the operation of the electric power converter 30.

The configuration is not limited to this, and the capacitor 10 may be provided with a SOC detector to detect the SOC, a current detector to detect a value of input/output current, and a voltage detector to detect voltage. Similarly, the secondary battery 20 may be provided with a SOC detector to detect the SOC, and the electric power convener 30 may be provided with a current detector to detect input/output current. The capacitor SOC detection unit 51 may be configured to calculate the SOC based on the voltage of the capacitor 10 that is detected by the capacitor voltage detection unit 53.

The controller SO includes: a request power calculation unit 61 to calculate request input/output power for the motor generator 2 based on the current and the voltage of the capacitor 10 and the input/output current of the electric power converter 30; a capacitor discharging bias factor map 62 to specify the ratio of electric power to be supplied from the capacitor 10 to the motor generator 2 to the request input power calculated by the request power calculation unit 61, based on the SOC of the capacitor 10; and a capacitor charging bias factor map 63 to specify the ratio of electric power to be stored in the capacitor 10 from the motor generator 2 to the request output power calculated by the request power calculation unit 61, based on the SOC of the capacitor 10.

Figure 3A:
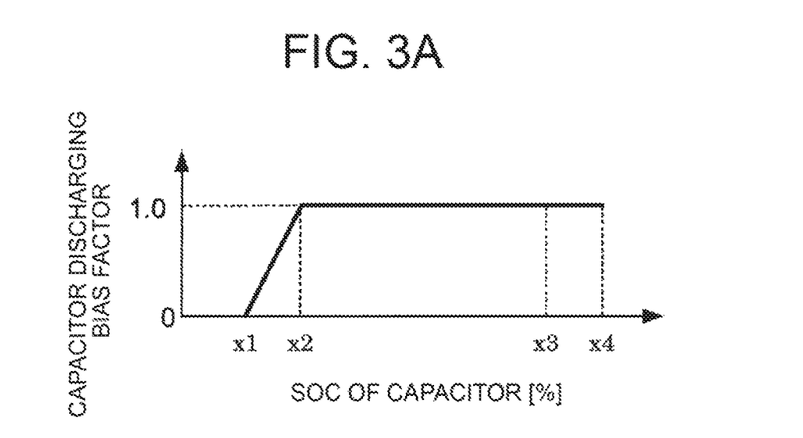
FIG. 3A describes one example of a capacitor discharging bias factor map.

The request power calculation unit 61 calculates request input/output power Preq [W] from current Ic [A] and voltage Vc [V] of the capacitor 10 and input/output current Iref [A] of the electric, power converter 30 between the motor generator 2 and the electric power converter 30 by Vc×(Ic+Ibref). The request input/output power Preq [W] is electric power required when the motor generator 2 operates as a motor, or is regenerative electric power output when the motor generator 2 operates as a generator. The input/output current Ibref [A] flows from the electric power converter 30 to the motor generator 2 when electric power is supplied to the motor generator 2, and flows from the motor generator 2 to the electric power converter 30 when charging with regenerative electric power from the motor generator 2 is performed, As shown in FIG. 3A, the capacitor discharging bias factor map 62 determines the bias factor in accordance with the SOC of the capacitor 10 that is input from the capacitor SOC detection unit 51. When the SOC of the capacitor 10 is equal to or greater than x2 [%] that is a preset first setting value, the capacitor discharging bias factor map 62 outputs 1.0.

The capacitor discharging bias factor map 62 is configured so that, as the SOC of the capacitor 10 falls below x2 [%] and decreases, the amount of electric power discharged from the capacitor 10 decreases, and when it decreases to be x1 [%], the amount of electric power reaches 0. At this time, the amount of electric power discharged from the secondary battery 20 increases by the amount of a decrease in electric power discharged from the capacitor 10. Herein x1 [%] is set at the SOC corresponding to the voltage obtained by adding a margin to the minimum operable voltage of the inverter 3, and x2 [%] is set at the SOC by adding, to x1 [%], about 5 to 10% of the range from x1 [%] to x4 [%] so as to avoid hunting.

In this way, the capacitor discharging bias factor map 62 is configured so that, when electric power is supplied to the motor generator 2, if the SOC of the capacitor 10 is equal to or greater than x2 [%], electric power is supplied from the capacitor 10 only, and if the SOC of the capacitor 10 falls below x2 [%], a part or the entire of electric power is supplied from the secondary battery 20.

Figure 3B:
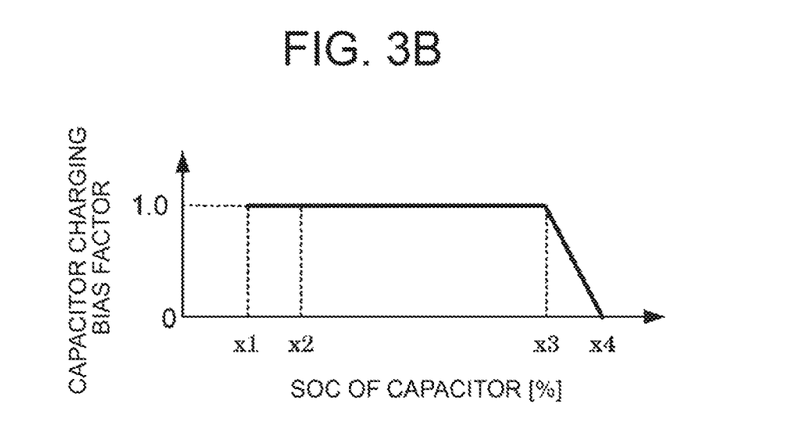
FIG. 3B describes one example of a capacitor charging bias factor map.

Similarly as shown in FIG. 3B, the capacitor charging bias factor map 63 determines the bias factor in accordance with the SOC of the capacitor 10 that is input from the capacitor SOC detection unit 51. When the SOC of the capacitor 10 is equal to or smaller than x3 [%] that is a preset second setting value, the capacitor charging bias factor map 63 outputs 1.0.

The capacitor charging bias factor map 63 is configured so that, as the SOC of the capacitor 10 exceeds x3 [%] and increases, the amount of electric power stored in the capacitor 10 decreases, and when it increases to be x4 [%], the amount of electric power reaches 0. At this time, the amount of electric power stored in the secondary battery 20 increases by the amount of a decrease in electric power stored in the capacitor 10. Herein x4 [%] is sot at the SOC corresponding to the voltage when the capacitor 10 is fully charged, and x3 [%] is set at the SOC by subtracting, from x4 [%], about 5 to 10% of the range from x1 [%] to x4 [%] so as to avoid hunting.

In this way, the capacitor charging bias factor map 63 is configured so that, when charging with regenerative electric power from the motor generator 2 is performed, if the SOC of the capacitor 10 is equal to or smaller than x3 [%], the regenerative electric power is stored in the capacitor 10 only, and if the SOC of the capacitor 10 exceeds x3 [%], a part or the entire of the regenerative electric power is stored in the secondary battery 20.

As shown in FIG. 2, the controller 50 includes: a multiplication unit 64 to multiply the bias factor obtained from the capacitor discharging bias factor map 62 by the request input power; a multiplication unit 65 to multiply the bias factor obtained from the capacitor charging bias factor map 63 by the request output power; a charge/discharge changing switch 66 to change between the discharge from the capacitor 10 and the charge in the capacitor 10 in accordance with request input/output power; and a subtraction unit 67 to calculate charge/discharge power of the secondary battery 20 by subtracting, from the request input/output power, the charge/discharge power of the capacitor 10 obtained from the capacitor discharging bias factor map 62 or the capacitor charging bias factor map 63.

The multiplication unit 64 multiplies the bias factor obtained from the capacitor discharging bias factor map 62 by the request input/output power Preq [W] calculated by the request power calculation unit 61. At this time, the bias factor is a value from 0 to 1.0. Therefore the multiplication unit 64 calculates the magnitude of the target capacitor output to be supplied from the capacitor 10 to the motor generator 2 out of the request input/output power Preq [W].

Similarly, the multiplication unit 65 multiplies the bias factor obtained from the capacitor charging bias factor map 63 by the request input/output power Preq [W] calculated by the request power calculation unit 61. At this time, the bias factor is a value from 0 to 1.0. Therefore the multiplication unit 65 calculates the magnitude of the target capacitor output to be stored from the motor generator 2 to the capacitor 10 out of the request input/output power Preq [W].

The charge/discharge changing switch 66 determines whether the request input/output power Preq [W] calculated by the request power calculation unit 61 is a positive value or a negative value. When the request input/output power Preq [W] is a positive value, the charge/discharge changing switch 66 changes so that the capacitor 10 performs discharge target capacitor output is positive), and when the request input/output power Preq [W] is a negative value, it changes so that the capacitor 10 performs charge (target capacitor output is negative).

The subtraction unit 67 subtracts the target capacitor output of the capacitor 10 from the request input/output power Preq [W] calculated by the request power calculation unit 61. Thereby target secondary-battery output of the secondary battery 20 is calculated.

The controller 50 includes: a charge/discharge map 71 to specify the upper limit of the range of SOC that the secondary battery 20 can use a charge/discharge map 72 to specify the lower limit thereof, and a charge/discharge limiter 73 to limit the output of the secondary battery 20 based on the upper and lower limits of the output of the secondary battery 20 obtained from the charge/discharge maps 71, 72.

Figure 4A:
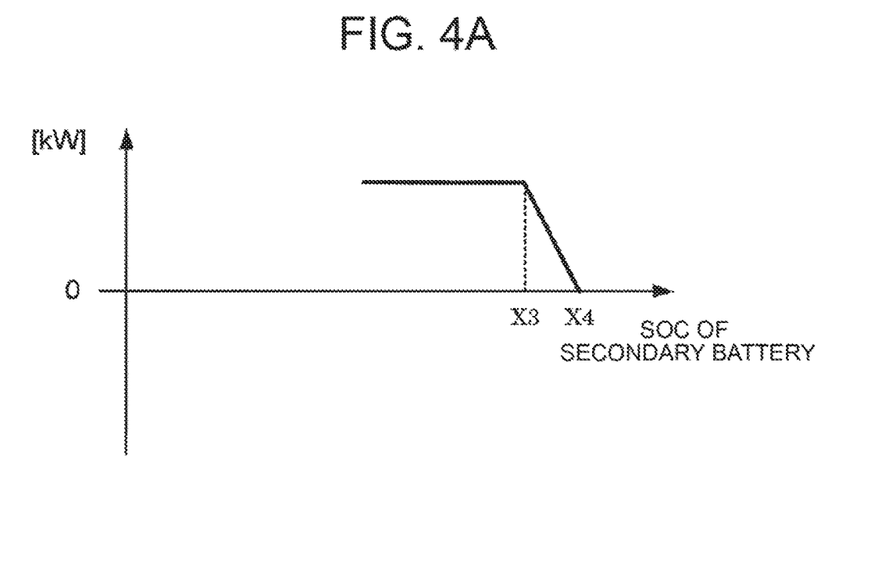
FIG. 4A describes one example of a charge/discharge map of a secondary battery.
Figure 4B:
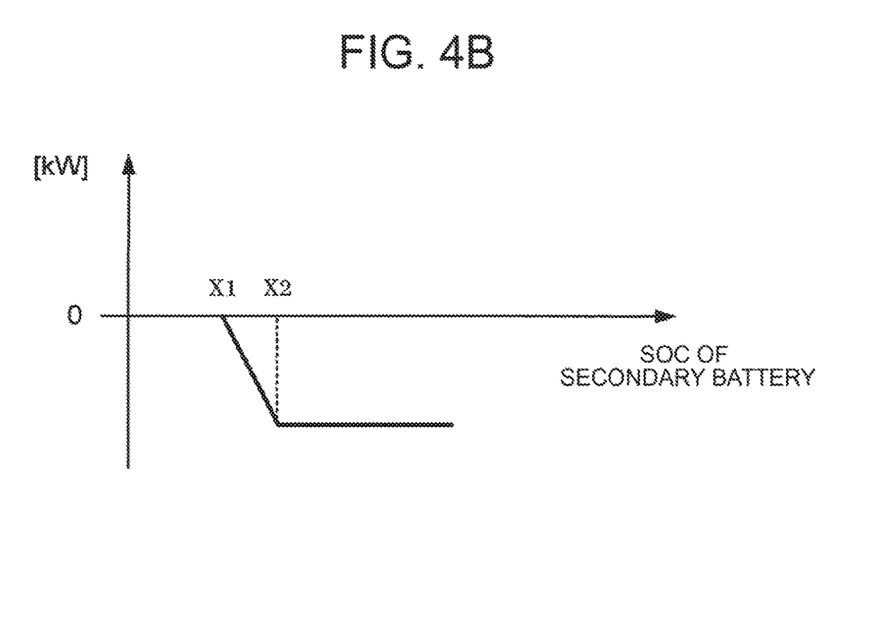
FIG. 4B describes one example of a charge/discharge map of a secondary battery.

To the charge/discharge maps 71, 72, SOC [%] of the secondary battery 20 is input from the secondary battery SOC detection unit 55. As shown in FIGS. 4A and 4B, if the SOC of the secondary battery 20 is larger than a predetermined value X4, the output to the positive side is limited. That is, charge from the motor generator 2 to the secondary battery 20 is limited. If the SOC of the secondary battery 20 is smaller than a predetermined value X1, the output to the negative side is limited. That is, discharge from the secondary battery 20 to the motor generator 2 is limited.

In FIG. 4A, the charge/discharge map 71 is configured so that, in order to prevent an abrupt change of the charge/discharge electric power of the secondary battery 20 caused by a change of the SOC, the output decreases with increase in SOC between a predetermined value X3 and X4 that is larger than X3, and the output is not performed, i.e., charge from the motor generator 2 to the secondary battery 20 is not performed at the time when the SOC reaches the predetermined value X4.

Similarly, in FIG. 4B, the charge/discharge map 72 is configured so that the output on the negative side decreases with decrease in SOC between a predetermined value X2 and X1 that is smaller than X2, and the output is not performed, i.e., discharging from the secondary battery 20 to the motor generator 2 is not performed at the time when the SOC reaches the predetermined value X1.

The upper limit of the charge/discharge amount in these charge/discharge maps 71, 72 is set as the maximum output of the electric power converter 30.

The following describes the operation of the charge/discharge system 1, with reference to FIGS. 5A to 6C.

Figure 5A:
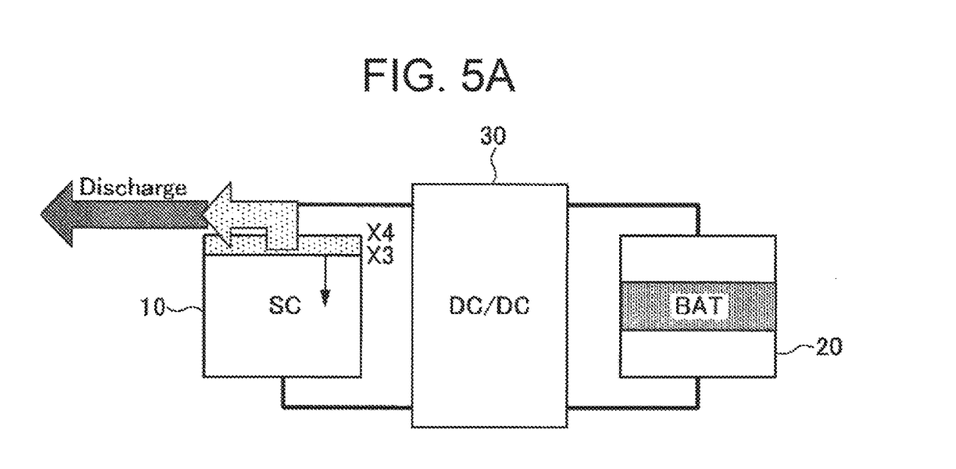
FIG. 5A describes operation of the charge/discharge system during discharging, showing the case where the SOC of the capacitor is in the range from x4 to x3.
Figure 5B:
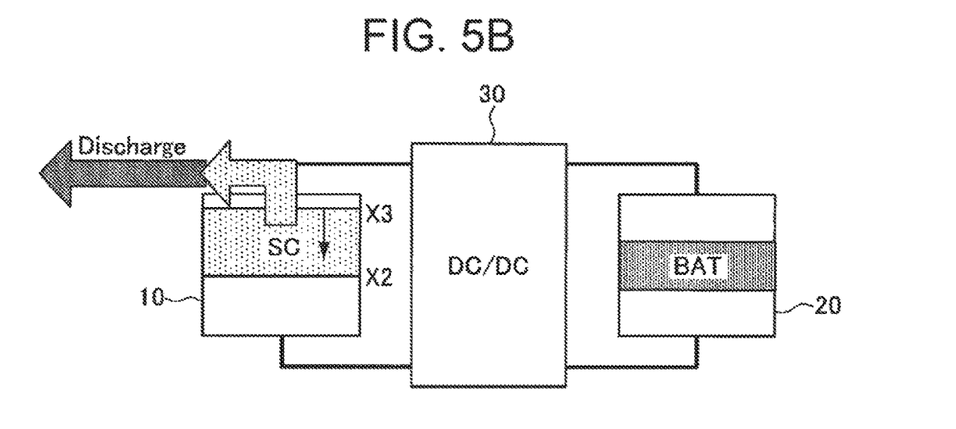
FIG. 5B describes operation of the charge/discharge system during discharging, showing the case where the SOC of the capacitor is in the range from x3 to x2.
Figure 5C:
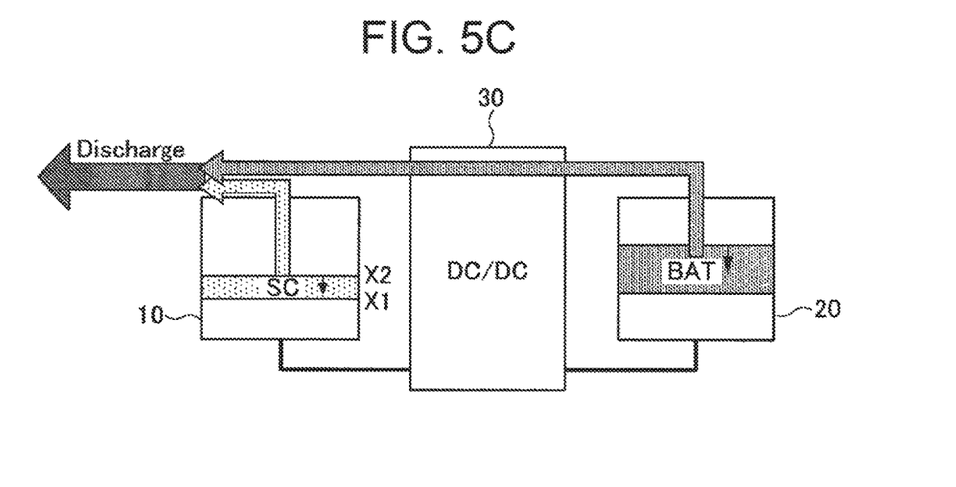
FIG. 5C describes operation of the charge/discharge system during discharging, showing the case where the SOC of the capacitor is in the range from x2 to x1.

Firstly mainly referring to FIGS. 5A to 5C, the operation of the charge/discharge system 1 during supplying of electric power from the capacitor 10 and the secondary battery 20 to the motor generator 2 is described.

As shown in FIG. 5A, when the SOC of the capacitor 10 is in the range from x4 to x3, since the SOC of the capacitor 10 has sufficient margin, the bias factor obtained from the capacitor discharging bias factor map 62 is 1.0. Therefore, since the electric power output from the capacitor 10 becomes equal to the request input/output power Preq [W], the electric power is supplied from the capacitor 10 only to the motor generator 2.

As shown in FIG. 5B, similarly in the case where the SOC of the capacitor 10 is in the range from x3 to x2 as well, since the SOC of the capacitor 10 has sufficient margin, the electric power is supplied from the capacitor 10 only to the motor generator 2.

As shown in FIG. 5C, when the SOC of the capacitor 10 is in the range from x2 to x1, the bias factor obtained from the capacitor discharging bias factor map 62 is a value of 0 or more and less than 1.0. Therefore, the multiplication unit 64 multiplies the bias factor and the request input/output power Preq [W] together, whereby the magnitude of the electric power to be supplied from the capacitor 10 to the motor generator 2 is calculated.

Then, the subtraction unit 67 subtracts the electric power output from the capacitor 10 from the request input/output power Preq [W] calculated by the request power calculation unit 61, Thereby, the magnitude of the electric power to be supplied from the secondary battery 20 to the motor generator 2 is calculated.

Therefore when the SOC of the capacitor 10 is in the range from x2 to x1, the magnitude of electric power is determined so that the sum of the electric power output from the capacitor 10 and the electric power output from the secondary battery 20 equals the request input/output power Preq [W]. At this time, as the SOC of the capacitor 10 decreases from x2 to x1, the magnitude of the electric power output from the secondary battery 20 gradually increases. Then, when the SOC of the capacitor 10 reaches x1, the electric power is supplied from the secondary battery 20 only to the motor generator 2.

In this way, the ratio of electric power of discharging from the capacitor 10 to the request input/output power Preq [W] of the motor generator 2 calculated by the request power calculation unit 61 can be obtained from the capacitor discharging bias factor map 62. Then, the subtraction unit 67 subtracts the discharging electric power of the capacitor 10 obtained from the capacitor discharging bias factor map 62 from the request input/output power Preq [W], whereby the ratio of electric power of discharging from the secondary battery 20 is determined. In this way, the sum of the electric power of discharging from the capacitor 10 and from the secondary battery 20 equals the request input/output power Preq [W].

Figure 6A:
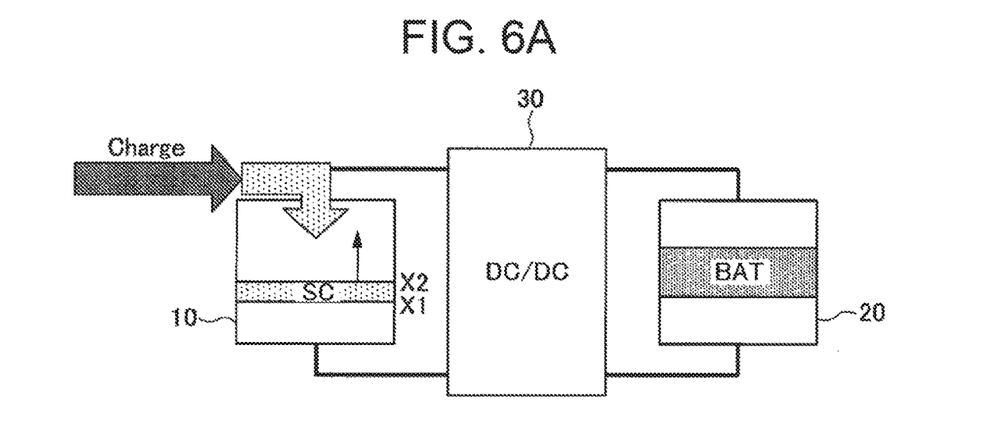
FIG. 6A describes operation of the charge/discharge system during charging, showing the case where the SOC of the capacitor is in the range from x1 to x2.
Figure 6B:
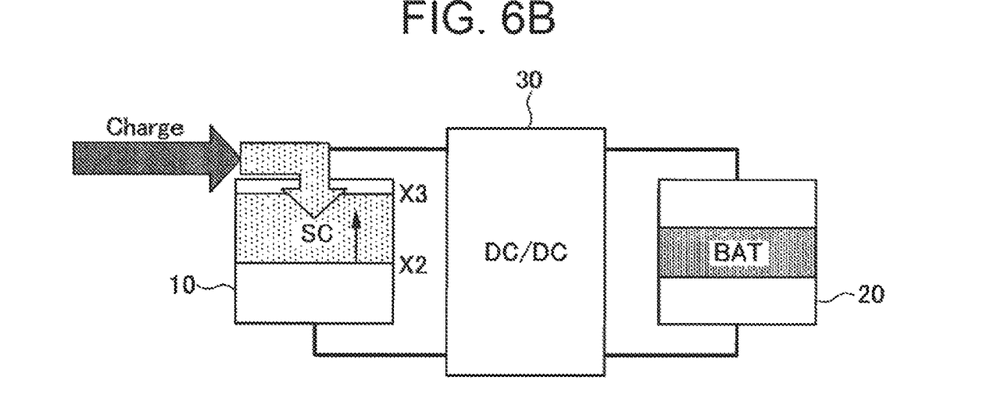
FIG. 6B describes operation of the charge/discharge system during charging, showing the case where the SOC of the capacitor is in the range from x2 to x3.
Figure 6C:
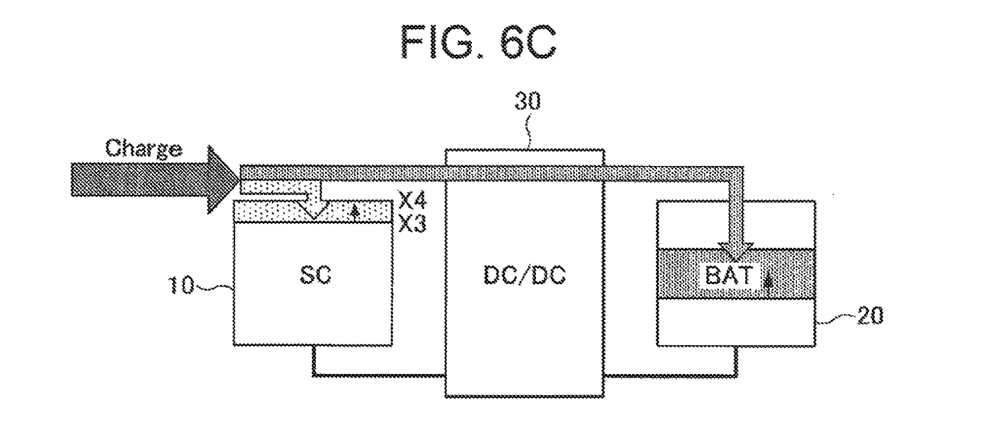
FIG. 6C describes operation of the charge/discharge system during charging, showing the case where the SOC of the capacitor is in the range from x3 to x4.

Next mainly referring to FIGS. 6A to 6C, the operation of the charge/discharge system 1 during charging of the capacitor 10 and the secondary battery 20 with regenerative electric power from the motor generator 2 is described.

As shown in FIG. 6A, when the SOC of the capacitor 10 is in the range from x1 to x2, since the SOC of the capacitor 10 has sufficient free space, the bias factor obtained from the capacitor charging bias factor map 63 is 1.0. Therefore, since the electric power stored in the capacitor 10 becomes equal to the request input/output power Preq [W], the regenerative electric power from the motor generator 2 is stored in the capacitor 10 only.

As shown in FIG. 6B, in the case where the SOC of the capacitor 10 is in the range from x2 to x3 as well, since the SOC of the capacitor 10 has sufficient free space, the regenerative electric power from the motor generator is stored in the capacitor 10 only.

As shown in FIG. 6C, when the SOC of the capacitor 10 is in the range from x3 to x4, the bias factor obtained from the capacitor charging bias factor map 63 is a value of 0 or more and less than 1.0. Therefore, the multiplication unit 65 multiplies the bias factor by the request input/output power Preq [W], whereby the magnitude of the regenerative electric power to be stored from the motor generator 2 in the capacitor 10 is calculated.

Then, the subtraction unit 67 subtracts the electric power to be stored in the capacitor 10 from the request input/output power Preq [W] calculated by the request power calculation unit 61. Thereby, the magnitude of the electric power to be stored from the motor generator 2 in the secondary battery 20 is calculated.

Therefore when the SOC of the capacitor 10 is in the range from x3 to x4, the magnitude of electric power is determined so that the sun of the electric power to be stored in the capacitor 10 and the electric power to be stored in the secondary battery 20 equals the request input/output power Preq [W]. At this time, as the SOC of the capacitor 10 increases from x3 to x4, the magnitude of the electric power to be stored In the secondary battery 20 gradually increases. Then, when the SOC of the capacitor 10 reaches x4, the regenerative electric power is stored from the motor generator 2 in the secondary battery 20 only.

In this way, the ratio of electric power to be charged from the capacitor 10 to the request input/output, power Preq [W] of the motor generator 2 calculated by the request power calculation unit 61 can be obtained from the capacitor charging bias factor map 63. Then, the subtraction unit 67 subtracts the charging electric power of the capacitor 10 obtained from the capacitor charging bias factor map 63 from the request input/output power Preq [W], whereby the ratio of electric power to be charged from the secondary battery 20 is determined. In this way, the sum of the electric power to be charged from the capacitor 10 and the secondary battery 20 equals the request input/output power Preq [W].

As described above referring to FIGS. 5A to 6C, the capacitor 10 performs charge/discharge with the motor generator 2 only, and no charge/discharge is performed between the capacitor 10 and the secondary battery 20. Therefore, energy loss due to unnecessary charge/discharge can be suppressed, whereby the capacity of the capacitor 10 can be used maximally. This can lead to improvement in energy efficiency of the charge/discharge system 1 including the capacitor 10 and the secondary battery 20.

Similarly the secondary battery 20 also performs charge/discharge with the motor generator 2 only. Therefore charge/discharge frequency of the secondary battery 20 can be decreased, and so the life of the secondary battery 20 can be made longer. Further, the capacity of the secondary battery 20 also can be made smaller, and the size and weight of the secondary battery 20 can be decreased. Alternatively, instead of making the capacity of the secondary battery 20 smaller, an inexpensive lead storage battery can be used as the secondary battery 20, for example. This can reduce the cost of the secondary battery 20.

The above-stated control can be implemented simply by controlling to distribute electric power between the capacitor 10 and the secondary battery 20 using the controller 50 without depending on a high-order system that is controlled by the ECU 100. Therefore, the charge/discharge system 1 including the capacitor 10 and the secondary battery 20 can be used as if it were a single storage battery.

The above-stated embodiments have the following advantageous effects.

in the charge/discharge system 1, the request input/output power Preq [W] of the motor generator 2 is calculated by the request power calculation unit 61. Then, the ratio of electric power of charge/discharge by the capacitor 10 is determined from the capacitor discharging bias factor map 62 and the capacitor charging bias factor map 63 that are specified based on the SOC of the capacitor 10. Then the subtraction unit 67 subtracts the charging/discharging electric power of the capacitor 10 obtained from the capacitor discharging bias factor map 62 or the capacitor charging bias factor map 63 from the request input/output power Preq [W], whereby the ratio of electric power of charging/discharging by the secondary battery 20 is determined. In this way, the sum of the electric power of charging/discharging by the capacitor 10 and by the secondary battery 20 equals the request input/output power Preq [W], and therefore no charge/discharge is performed between the capacitor 10 and the secondary battery 20. This can lead to improvement in energy efficiency of the charge/discharge system 1 including the capacitor 10 and the secondary battery 20.

Although embodiments of the present invention are described above, the above embodiments are merely a part of examples of the application of the present invention, and the technical scope of the present invention is not limited to the specific constitutions of the above embodiments.

For instance, although the secondary battery 20 is a lithium ion secondary battery in the description of the embodiments, this is not a limiting example, and other types of secondary batteries such as a lead storage battery or a nickel hydrogen battery may be used. The capacitor 10 also is not limited to the electric double-layer capacitor, and other types of capacitors such as a lithium ion capacitor may be used.

The invention claimed is:

1. A charge/discharge system capable of supplying electric power to an electric motor generator and of charging with regenerative electric power from the electric motor generator, comprising:
    a capacitor connected to the electric motor generator;
    a secondary battery connected in parallel to the capacitor;
    an electric power converter placed between the capacitor and the secondary battery to increase/decrease charge/discharge voltage of the secondary battery; and
    a controller to control the electric power converter, wherein the controller includes:
        a request power calculation unit configured to calculate request input/output power for the electric motor generator based on current and voltage of the capacitor and input/output current of the electric power converter;
        a capacitor discharging bias factor map configured to specify a ratio of electric power to be supplied from the capacitor to the electric motor generator to the request input power calculated by the request power calculation unit, based on the SOC of the capacitor;
        a capacitor charging bias factor map configured to specify a ratio of electric power to be stored in the capacitor from the electric motor generator to the request output power calculated by the request power calculation unit, based on the SOC of the capacitor; and
        a subtraction unit configured to calculate charge/discharge power of the secondary battery by subtracting, from the request input/output power, the charge/discharge power of the capacitor obtained from the capacitor discharging bias factor map or the capacitor charging bias factor map.

2. The charge/discharge system according to claim 1, wherein
    the capacitor discharging bias factor map is configured so that, when electric power is supplied to the electric motor generator, if the SOC of the capacitor is equal to or greater than a preset first setting value, electric power is supplied from the capacitor only, and if the SOC of the capacitor falls below the first setting value, a part or an entire of electric power is supplied from the secondary battery.

3. The charge/discharge system according to claim 2, wherein
    the capacitor discharging bias factor map is configured so that, as the SOC of the capacitor falls below the first setting value and decreases, the amount of electric power discharged from the secondary battery increases.

4. The charge/discharge system according to claim 1, wherein
    the capacitor charging bias factor map is configured so that, when charge with regenerative electric power from the electric motor generator is performed, if the SOC of the capacitor is equal to or smaller than a preset second setting value, regenerative electric power is stored in the capacitor only, and if the SOC of the capacitor exceeds the second setting value, a part or an entire of regenerative electric power is stored in the secondary battery.

5. The charge/discharge system according to claim 4, wherein
    the capacitor charging bias factor map is configured so that, as the SOC of the capacitor exceeds the second setting value and increases, the amount of electric power stored in the secondary battery increases.

* * * * *